United States Patent
Bigolin (10) Patent No.: US 9,751,580 B2
(45) Date of Patent: Sep. 5, 2017

(54) SEAT FOR BICYCLE SADDLES AND THE LIKE, AND METHOD FOR ITS MANUFACTURING

(71) Applicant: BROOKS ENGLAND LIMITED, Birmingham (GB)

(72) Inventor: Barbara Bigolin, Asolo (IT)

(73) Assignee: BROOKS ENGLAND LIMITED, Birmingham (GB)

(*) Notice: Subject to any disclaimer, the term of this patent is extended or adjusted under 35 U.S.C. 154(b) by 0 days.

(21) Appl. No.: 14/898,913

(22) PCT Filed: Jun. 17, 2014

(86) PCT No.: PCT/IB2014/062300
§ 371 (c)(1),
(2) Date: Dec. 16, 2015

(87) PCT Pub. No.: WO2014/203165
PCT Pub. Date: Dec. 24, 2014

(65) Prior Publication Data
US 2016/0368553 A1 Dec. 22, 2016

(30) Foreign Application Priority Data

Jun. 17, 2013 (IT) .............................. VR2013A0143

(51) Int. Cl.
*B62J 1/18* (2006.01)
*B32B 25/10* (2006.01)
(Continued)

(52) U.S. Cl.
CPC ................. *B62J 1/18* (2013.01); *B29C 70/68* (2013.01); *B32B 25/10* (2013.01); *B62J 1/002* (2013.01); *B29K 2667/00* (2013.01); *B29K 2705/00* (2013.01); *B29L 2031/771* (2013.01); *B32B 2262/02* (2013.01); *B32B 2262/0276* (2013.01);
(Continued)

(58) Field of Classification Search
CPC ......... B62J 1/02; B62J 1/00; B62J 1/18; B62J 2700/634; B29C 70/68; B32B 25/10; B32B 2262/0276; B32B 2605/00; B29K 2667/00; B29K 2705/00; B29L 2031/771
See application file for complete search history.

(56) References Cited

U.S. PATENT DOCUMENTS 4,842,332 A * 6/1989 Conner, Jr. ................. B62J 1/18
297/214
5,165,752 A * 11/1992 Terry .......................... B62J 1/18
297/202
(Continued)

FOREIGN PATENT DOCUMENTS

GB 431219 7/1935
GB 686332 1/1953

*Primary Examiner* — Philip Gabler
(74) *Attorney, Agent, or Firm* — Tutunjian & Bitetto, P.C.

(57) ABSTRACT

Seat for bicycle saddles and the like, including a first inner layer made from a rubber-type material, a second layer, made from a material of the natural or synthetic fabric type, placed over said first layer, and a fourth outer layer, made from a material of the natural fabric type. The first layer being cured together with said second layer and fourth layer so as to make a compact composite structure. It is also presented a method for the manufacturing of the seat.

22 Claims, 4 Drawing Sheets

(51) Int. Cl.
  *B62J 1/00*   (2006.01)
  *B29C 70/68*  (2006.01)
  *B29K 667/00*   (2006.01)
  *B29K 705/00*   (2006.01)
  *B29L 31/00*    (2006.01)

(52) U.S. Cl.
  CPC ... *B32B 2262/062* (2013.01); *B32B 2262/065* (2013.01); *B32B 2262/08* (2013.01); *B32B 2307/554* (2013.01); *B32B 2307/70* (2013.01); *B32B 2307/73* (2013.01); *B32B 2605/00* (2013.01); *B62J 2700/634* (2013.01)

(56) References Cited

U.S. PATENT DOCUMENTS

| | | | | |
|---|---|---|---|---|
| 5,911,475 A | * | 6/1999 | Nakahara | B62J 1/18 297/202 |
| 5,972,149 A | * | 10/1999 | Schiller | B29C 63/0065 156/212 |
| 6,409,865 B1 | | 6/2002 | Yates | |
| 6,666,507 B1 | * | 12/2003 | Ringgard | B62J 1/00 297/195.1 |
| 2006/0232111 A1 | * | 10/2006 | Hasegawa | B29C 33/3814 297/219.11 |
| 2010/0013278 A1 | | 1/2010 | Segato | |

\* cited by examiner

SEAT FOR BICYCLE SADDLES AND THE LIKE, AND METHOD FOR ITS MANUFACTURING

TECHNICAL FIELD OF THE INVENTION

The present invention relates to a seat for bicycle saddles and the like.

Moreover, the present invention relates to a method for the manufacturing of the seat itself.

STATE OF THE ART

Some types of traditional bicycles saddles or the like comprising saddle rails, or other similar elements, for the connection to the seat post, to which rigid elements for supporting a seat preferably made of flexible material are associated, are known.

Such rigid supporting elements, for example made of a metallic material, are normally provided in the front area and in the rear area of the saddle, and they usually have holes for fixing the seat, for example by rivets, or other similar connection means.

In most of the saddles of this type, the seat is for example made by leather which, as known, is a material that gives an optimal comfort to the user sitting, as well as good surface resistance characteristics that guarantee the durability over time.

As known, the leather seats, due to the mechanical features of this material, need an adjustment period to settle and to adapt to the shape of the seat of the user: this may result in an elongation, and a consequent loosening, of the seat itself.

In order to overcome this known drawback, one of the support rigid elements of this type of saddles—for example, the front support element, also called tip—is connected to other parts of the saddle itself—preferably to the saddle rails—by screw means adjustable by the user.

The leather seat should conveniently be put in traction, in order to compensate the aforementioned loosening, by acting on these screw means.

In other saddles of the known type, the aforementioned seat is made of another material, for example rubber, which can be natural or synthetic, or a mixture of natural and synthetic rubber, reinforced with a natural or synthetic fabric.

This material is affected to a much lesser extent by the above described problems relating to the loosening between the rigid support elements, and often it makes superfluous the provision of these adjustable screw means.

However, it was found that some of the typical characteristics of this material, in particular its surface characteristics, are not adequate to ensure an optimal user comfort, when compared with those of leather. Indeed, such material does not offer valuable features, for the unappealing contact surface, for the braking effect of the rubber, and for the friction effect on the skin that can cause redness and discomfort for the user.

Furthermore, the same surface features of the rubber are not able to ensure the same strength and durability of the leather.

SUMMARY OF THE INVENTION

The technical aim of the present invention is therefore to improve the state of the art.

Within such technical aim, a purpose of the present invention is developing a seat for bicycle saddles and the like having optimal strength and durability surface features.

Another object of the present invention is to provide a seat for bicycle saddles and the like which suffers in a negligible way of loosening effects due to the standing of the user.

A further object of the present invention is to provide a seat for bicycle saddles and the like that completely or partially uses renewable origin raw materials, in order to safeguard the environment and the available resources. This aim and these purposes are all achieved by the seat for bicycle saddles and the like according to the attached claim 1.

The seat according to the invention comprises a first inner layer made of a rubber-type material, a second layer made of a natural or synthetic fabric-type material, placed over the first layer, a third layer, made of a rubber-type material, placed over the second layer, and a fourth outer layer, made of the natural fabric-type material placed over the third layer.

The first layer and the third layer are cured together with the second layer and the fourth layer in order to realize a compact composite structure, with new mechanical and physical properties when compared with known seats for saddles.

Furthermore, the seat may include a reinforcement insert 18 made of metal or of another material interposed between the second layer 15 and third layer 16 at the front portion 5 of the seat itself.

In particular, the seat according to the present invention has the typical surface features of the natural fabric, and therefore pleasing at the user contact, together with the mechanical properties of the reinforced rubber concerning the behaviour of the seat itself under the load of the weight of the user.

The above aim and the above purposes are also achieved by the method for the manufacturing of the seat according to the present principles.

The present specification relates to preferred and advantageous embodiments of the invention.

BRIEF DESCRIPTION OF THE DRAWINGS

The features of the invention will be better understood by any man skilled in the art from the following description and from the attached drawings, given as a non-limiting example, wherein.

DETAILED DESCRIPTION OF THE INVENTION

Figure 1:
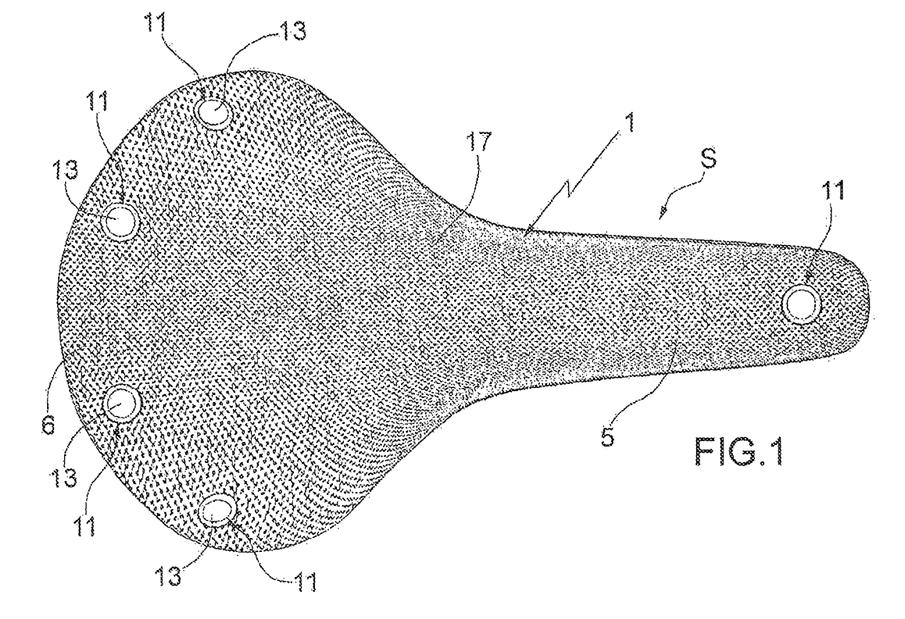
FIG. 1 is a top view of a saddle comprising a seat according to the invention.

With reference to the attached FIG. 1, it is wholly indicated with S a bicycle saddle and the like comprising a seat according to the present invention, the latter being wholly indicated with 1.

The saddle S comprises, in a per se known manner, means for the connection to a seat post, not shown in the figures.

Such connection means 2 are made up, per example, by saddle rails placed along the anterior-posterior axis, but they could also be of another equivalent type.

The saddle S also comprises elements 3, 4 for the support of the seat 1.

The support elements 3, 4 of the seat 1 are associated with the connection means 2.

In particular, two support elements are provided, a front one 3 and a rear one 4, respectively positioned at the front portion 5 and at the rear portion 6 of the saddle S.

More in detail, the front support element 3 is made up, for example, by a metal plate or cap, or by another equivalent element.

The front support element 3 can be possibly made of plastic material or another suitable material.

Figure 2:
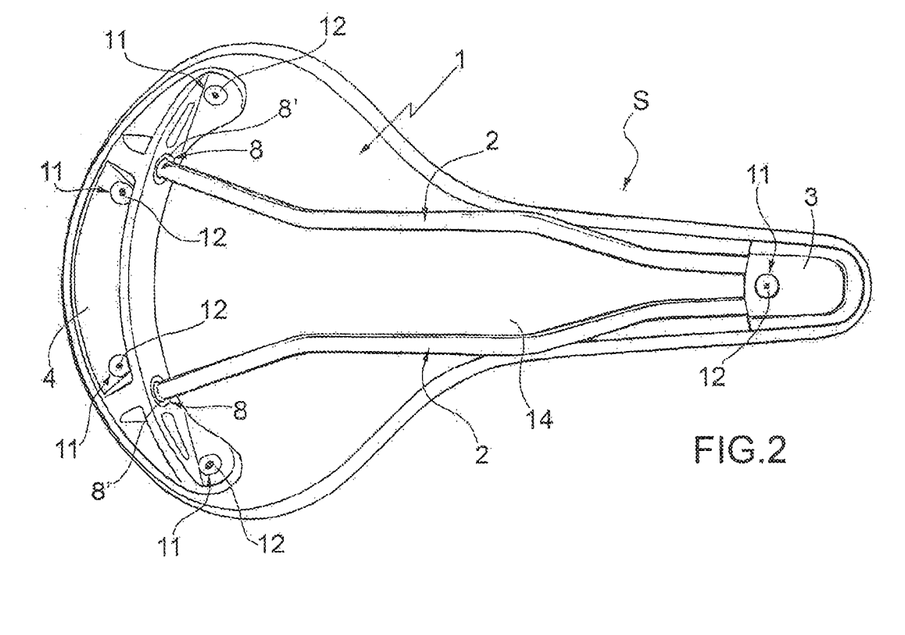
FIG. 2 is a bottom view of the saddle.
Figure 3:
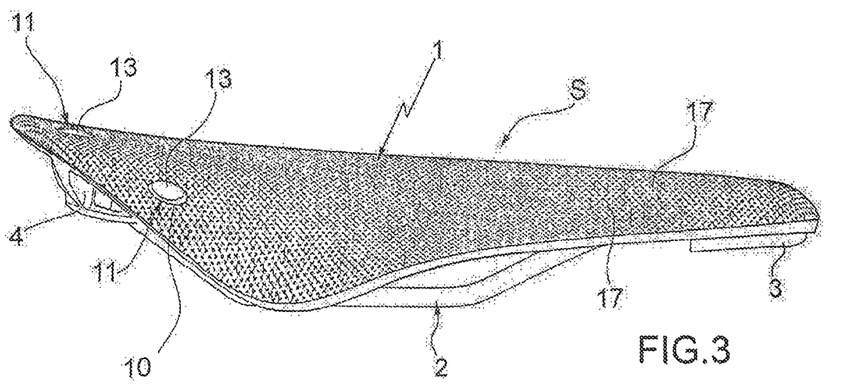
FIG. 3 is a side view of the saddle.
Figure 4:
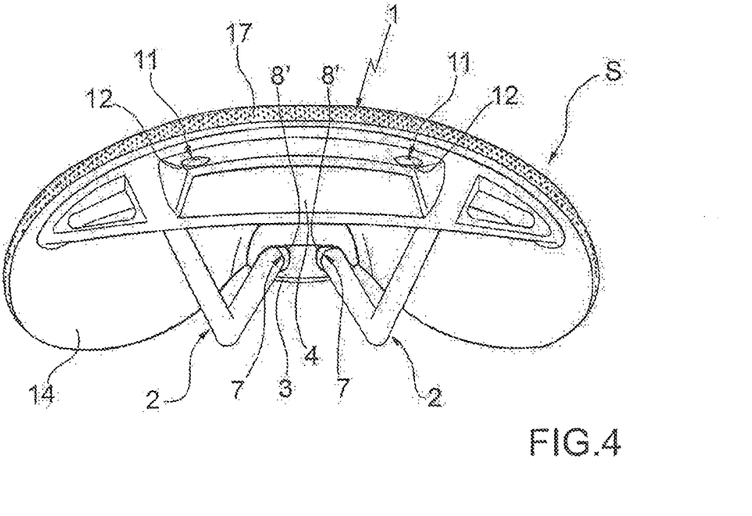
FIG. 4 is a rear view of the saddle.

In the front support element 3, two front housings 7, for example two blind holes, for inserting the front ends of the connection means 2, are provided, as shown in FIG. 4. The rear support element 4 of the seat 1, for example, is made up by a metallic arc that substantially corresponds to the shape of the rear portion 6 of the saddle S, or by another equivalent element.

The rear support element 4 can be possibly made of plastic material or another suitable material.

In the rear support element 4 two rear housings 8, for example two blind holes, for inserting the rear ends of the connection means 2, are provided, as shown in FIG. 2.

Two bushings 8' of polymeric and/or elastomeric material can be interposed between the rear ends of the connection means 2 and the rear housings 8, for the damping of the vibrations and for ensuring a good fitting between the metal parts with tight tolerances and a coupling that allows some relative degrees of freedom.

The seat 1 of the saddle S comprises through holes 9, 10 for the connection with the front support element 3 and to the rear support element 4.

For example, a single front through hole 9 for connecting the seat 1 with the front support element 3 is provided.

On the other hand, for connecting the seat 1 with the rear support element 4, for example four through holes 10 are provided.

In particular, such through holes 9, 10 affect correspondingly also the front support element 3 and the rear support element 4, as shown for example in FIG. 2.

Some elements for fastening the seat 1 to the support elements 3, 4, each wholly indicated with 11, are engaged at the through holes 9, 10.

Each of these fastening elements 11 comprises, for example, a recessed head screw 12 and a respective nut 13 screwed to the screw 12.

Both the screw 12 than the nut 13 have the respective heads conveniently flattened formed, in order to do not create excessive protrusions on the surface of the seat 1. Certainly, other means for fastening the saddle to the seat post can be provided, without departing from the protection scope of the present invention.

Figure 5:
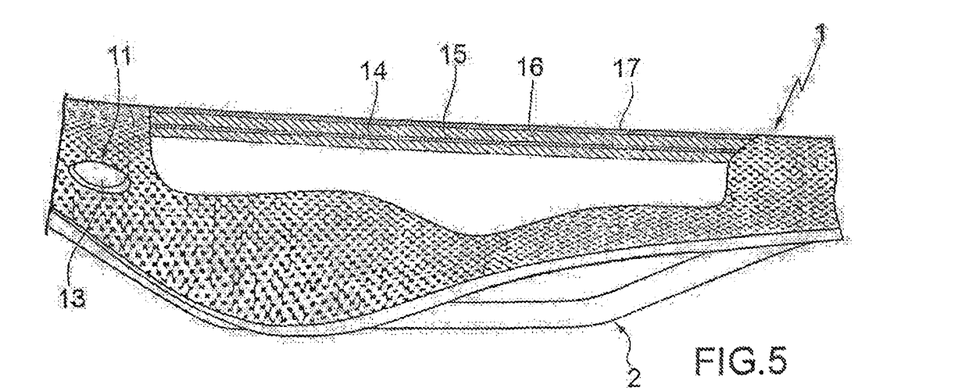
FIG. 5 is a detailed side view of the saddle partially sectioned at the seat according to the invention.
Figure 6:
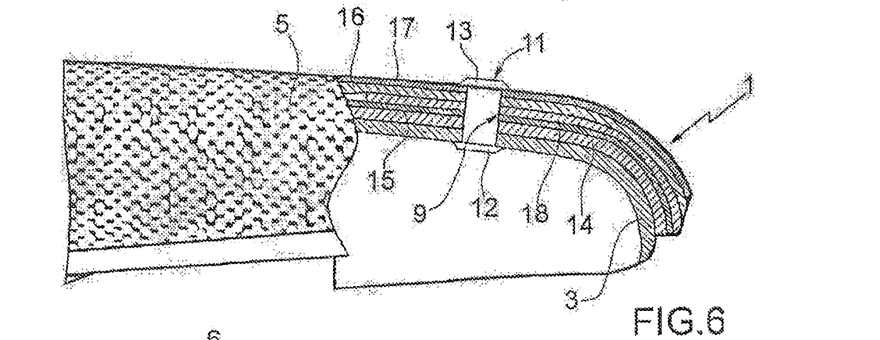
FIG. 6 is a detail and partially sectioned side view of the front portion of the saddle.

According to an aspect of the present invention, and with particular reference to FIGS. 5, 6, the seat 1 comprises a first inner layer 14.

The first inner layer 14 is made of a material of the rubber-type.

According to another aspect of the invention, the seat comprises a second layer 15.

The second layer 15 is placed over the first layer 14. The second layer 15 is made of a material of the natural or synthetic fabric-type.

According to a version of the invention, the natural or synthetic fabric comprises polyester.

In a further version of the invention, the material of the natural or synthetic fabric-type comprises cotton, hemp, linen, silk or other natural or synthetic fabrics suitably treated to permit the adhesion to the material of the rubber-type or mixtures of the same.

According to a yet further aspect of the present invention, the seat 1 comprises a third layer 16.

The third layer 16 is placed over the second layer 15. The third layer 16 is made of a material of the rubber-type.

According to a further aspect of the present invention, the seat 1 comprises a fourth outer layer 17.

The fourth layer 17 is placed over the above mentioned third layer 16.

The fourth layer 17 is made of a material of the natural fabric-type.

The fourth layer 17 is in contact with the user.

According to a further version of the present invention, the seat 1 can comprise a fifth layer 17'.

According to another version of the present invention, the seat 1 can comprise a fifth layer 17'.

Figure 8:
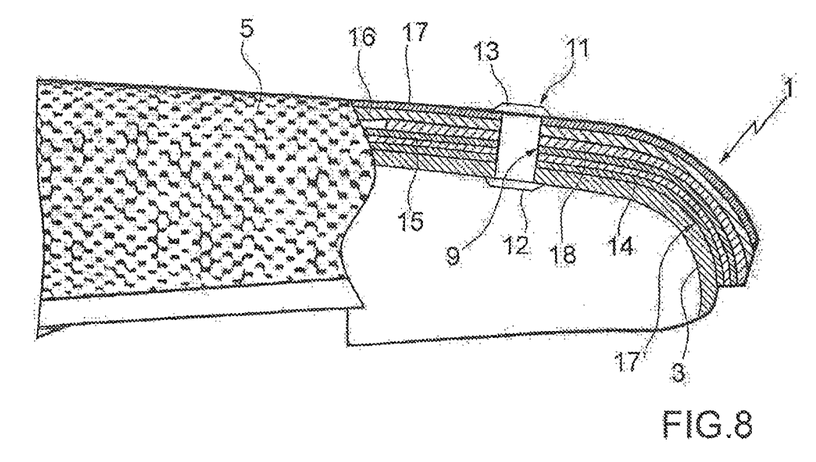
FIG. 8 is a detailed and partially sectioned side view of the front portion of the saddle according to another embodiment.

The fifth layer 17' is superimposed on the first inner layer 14, on the face of the first inner layer 14 opposite to that on which the second layer 15 is present, as shown in FIG. 8.

The fifth layer 17' is made of a material of the natural or synthetic fabric-type.

According to a version of the invention, the natural or synthetic fabric comprises polyester.

According to a further version of the invention, the natural or synthetic fabric-type material comprises cotton, hemp, linen, silk or other natural or synthetic fabrics that have been suitably treated to allow adhesion to the material of the rubber-type or mixtures thereof.

The material of the fifth layer 17' can be the same or different than that of the second layer 15.

As will be better clarify hereinafter, the first layer 14 and the third layer 16 are cured together to the aforesaid second layer 15 and fourth layer 17, and possibly together with the fifth layer 17' if present, in such a way to realize a compact composite structure with new characteristics.

Figure 9:
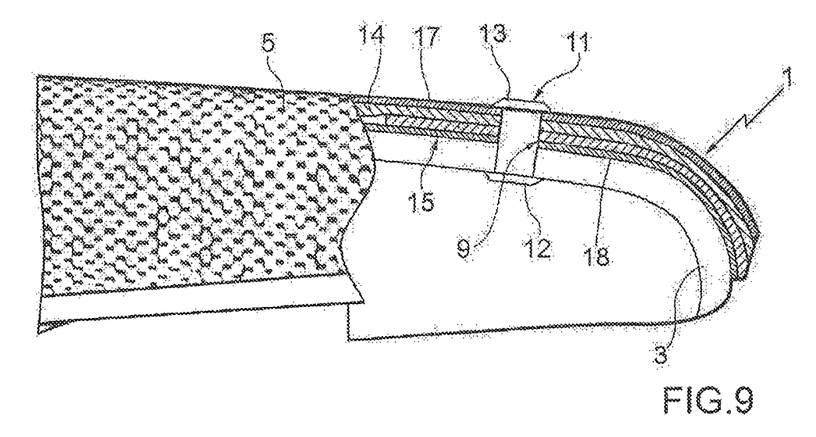
FIG. 9 is a detailed and partially sectioned side view of the front portion of the saddle according to another further embodiment.

In a further version of the invention, shown in FIG. 9, the seat 1 should be realized only by the first inner layer 14, having the second layer 15 overlapping a face of it, and the fourth layer 17, overlapping the opposite face of it, externally placed.

The second layer 15 and fourth layer 17 are visible from the outside, respectively, from the outer portion of the saddle S and from the inner portion thereof, whereas the seat S is in its use position.

Even according to this embodiment, the first layer 14 is cured together with the aforementioned second layer 15 and fourth layer 17 in such a way as to realize a compact composite structure with new characteristics.

More specifically, in a preferred embodiment of the invention, the first layer 14 of the seat 1 is made of a mixture of natural and synthetic rubber.

The above mixture of natural and synthetic rubber is prepared with appropriate percentages in order to ensure specific characteristics, and preferably an optimum resistance to atmospheric agents and a good workability to obtain the desired shape in the final product.

According to other embodiments, the first layer 14 of the seat 1 should be realized starting from a mixture comprising even other components.

Otherwise, in still other embodiments, the first layer should be realized exclusively of natural rubber, or exclusively of synthetic rubber, or even in another material of similar properties.

In particular, the first layer 14 is made up by a thin laminate sheet, with uniform thickness, with homogeneous characteristics.

The second layer 15 of the seat 1 is made of natural or synthetic fabric with a thickness comprised between 1 mm and 1.5 mm, having a high tensile strength and low ultimate elongation.

Preferably, the fabric, of which the second layer 15 is made, has a thickness of 1.2 mm.

Only by way of example, a polyester fabric having tensile strength of 800 N/cm and an ultimate elongation of about 20% can be employed.

Clearly, the characteristics of the second layer 15 in natural or synthetic fabric can be suitably modified according to the specific application needs.

Furthermore, the natural or synthetic fabric used for the realization of the second layer 15 is developed in such a way that it has a good elasticity and a good adhesion to the rubber.

Also the third layer 16 of the seat is made of a mixture of natural or synthetic rubber.

In a preferred embodiment of the invention, the third layer 16 of the seat 1 is made of a mixture of natural and synthetic rubber having the same proportions, or substantially the same proportions, than that used to make the first layer 14.

The third layer 16, therefore, substantially have the same mechanical characteristics of the first layer 14.

According to other embodiments, the third layer 16 may be made of a mixture of natural and synthetic rubber characterized by different proportions when compared with the mixture used to make the first layer 14.

In some embodiments, the thickness of the third layer 16 of the seat 1 can be different than that of the first layer 14, according to specific characteristics to be achieved in the final product.

In detail, the fourth layer 17 of the seat 1 is made of a material selected from cotton, linen, silk, and other similar materials.

In particular, the material by which the fourth layer 17 of the seat 1 is made of is a material suitable for ensuring high comfort to the user, in order to eliminate the sometimes unpleasant sensations that the direct contact with the rubber, both natural or synthetic, can determine in some saddles of the known type.

The fourth layer 17 of the seat 1 comprises a treatment suitable for making it water-repellent, stain-resistant and abrasion resistant.

More specifically, this treatment is of the type that is carried out with a solution in water suitable for ensuring water repellence, stain resistance and abrasion resistance to the tissue on which it is carried out.

In particular, the abrasion resistance is obtained thanks to the reduction of the friction coefficient. It is also obtained a high resistance to the sunlight exposure.

This treatment is suitable for protecting the fibers with an anti-adhesive effect.

The treatment makes the fibers resistant to variable use temperatures, for example, between −20° C. and 80° C.

Moreover, thanks to the above treatment, the fabric of which the fourth layer 17 is made is washable up to 60° C.

The product used to carry out the aforementioned treatment has a chemical compliance in accordance with the REACH Regulation (Registration, Evaluation, Authorisation and Restriction of Chemicals), of the European Union, concerning the contact with the user's skin.

In the complex, in a preferred but not exclusive version of the invention, the composite structure of the seat S comprising the aforesaid layers has a specific weight of 1,10 kg/dm3 and/or a water absorption during 24 hours less than 1% of water supplied.

Moreover, in a preferred but not exclusive version of the invention, the composite structure of the seat S comprising the aforementioned layers has at least one of the following mechanical properties: ultimate tensile stress (Rm) comprised between 100 and 500 daN/cm, preferably Rm equal to 140 daN/cm; percentage elongation equal to 10%±10%.

The tensile strength Rm is calculated over a width of 1 cm of a test specimen of the above composite structure of the saddle S.

According to another aspect of the present invention, the seat 1 comprises a metal reinforcement insert 18. The metal reinforcement insert 18 is interposed between the second layer 15 and third layer 16.

More in detail, the metallic insert 18 is interposed between the second layer 15 and the third layer 16 at the front portion 5 of the saddle S, as shown in FIGS. 6 and 8.

In a further version of the invention, the metal insert 18 is interposed between the first layer 14 and second layer 15 at the front portion 5 of the saddle S, as shown in FIG. 9.

In particular, the metal insert 18 has reinforcement function of the anchorage between the seat 1 and the front support element 3.

In fact, as mentioned, this anchorage is preferably carried out by a single fastening element 11, and this could lead during the use, in the absence of the metallic insert 18, to high stresses at the through hole 9 drilled in the seat 1, with consequent risks of damaging or tearing.

In one version of the invention, the insert 18 is made of plastic or another suitable material.

In the following, the process of manufacture of the seat 1, as previously disclosed, according to the present invention is described.

The method comprises a step of providing the first inner layer 14 of the seat.

More specifically, the above step of providing the first layer 14 comprises a step of mixing natural and/or synthetic rubber with appropriate percentages in order to ensure certain characteristics, i.e. preferably optimal weather resistance and good machinability.

Moreover, this step of providing the first layer 14 comprises a subsequent step of laminating the mixture of natural and/or synthetic rubber in thin constant thickness sheets with homogeneous characteristics.

The step of providing the first layer 14 then comprises a step of cutting the laminated sheet by a die or other similar cutting organs.

By means of this cutting step the perimeter of the first layer 14 is defined, so as to define the shape and dimensions of the finished product using the right amount of rubber blend.

The method then provides a step of providing the second layer 15 of the seat 1, in natural or synthetic fabric, having the characteristics above described.

Also the step of providing the second layer 15 comprises a step of cutting the natural or synthetic fabric with a die or other similar cutting organs, so as to define the shape and dimensions of the finished product using the right amount of fabric.

The method also provides for a step of providing the third layer 16 of the seat 1.

The latter step is, from an operational point of view, substantially the same as that one disclosed for the manufacturing of the first layer 14.

Obviously, according to specific application needs, in some embodiments of the invention the step of providing the third layer 16 may comprise different operations with respect to the step of providing the first layer 14, according to the characteristics of the product to be obtained.

The method also comprises a step of providing the fourth outer layer 17 of the seat 1, made of a material of the natural fabric-type.

Even the step of providing the fourth layer 17 comprises a cutting step of the natural fabric with a die cutting or other similar cutting organs, so as to define the shape and dimensions of the finished product using the right amount of fabric.

The manufacturing method then comprises a step of positioning the aforementioned layers 14-17 on each other, in the listed order, within a metal mould, provided with a cavity having the shape of the product to be made.

It is also foreseen the insertion of the metallic insert 18 between the second layer 15 and third layer 16, at the front portion 5.

It is then provided a step of compressing said layers 14-17, one against the other together with the metal insert 18, at a predetermined temperature and for a predetermined time.

During this step, the first layer 14 and the third layer 16 are cured together with the second layer 15 and fourth layer 17, thus realizing a compact composite structure, optionally comprising even the metal insert 18. In a version of the invention, the insert 18 is made of plastic or other suitable material, rather than of metal. In particular, in the following of the present description, where an element is disclosed as made of a metallic material, it is to be understood that possibly it can be realized in plastic material or other suitable material.

In particular, the composite structure thus obtained has new mechanical and physical properties, not discernible from any known product, due to the curing of rubber and the bonding that the latter exerts with the fabrics of the second layer 15 and the fourth layer 17.

In particular, the said step of compressing the layers 14-17 one against the other is carried out, for example, through a press with tonnage of 200 tonnes, or with other equipment with equivalent characteristics.

In some embodiments of the invention, the aforementioned predetermined temperature at which is carried out the compression step of the layers 14-17, one on the other, is comprised between 100° C. and 200° C.

In a preferred embodiment of the invention, the predetermined temperature is 160° C.

Moreover, in some embodiments of the invention, the aforementioned predetermined time, during which is carried out the compression of the layers 14-17 one on the other, is comprised between 10 minutes and 20 minutes.

In a preferred embodiment of the invention, the predetermined time is 15 minutes.

The manufacturing method then provides a step of treating the fourth layer 17 of natural fabric of the seat 1 with a solution in water suitable for securing specific functional characteristics to the same fourth layer 17.

In particular, such characteristics are preferably the water repellence, stain resistance, abrasion resistance thanks to the low friction coefficient, resistance to sunlight exposure, the resistance to use temperatures between −20° C. and 80° C. and the washability up to 60° C.

It should be noted that the foregoing list of features is quite illustrative and not exhaustive.

In some embodiments of the invention, other or different surface treatments of the fourth layer 17 of natural fabric may be provided, for obtaining specific characteristics, without any particular limitations.

This step of surface treatment of the fourth layer 17 of the seat 1 can be realized indifferently both before and after the final and full assembly of the seat S, with all its components.

In a further version of the invention, in which the method is substantially similar to what disclosed, a step of providing the fifth layer 17' of the seat 1, having the characteristics described above, in natural or synthetic fabric, is provided.

Even the step of providing the fifth layer 17' comprises a step of cutting the natural or synthetic fabric with a die or other similar cutting organs, so as to define the shape and dimensions of the finished product using the right amount of fabric.

The manufacturing method then comprises a step of positioning said fifth layer 17' on said first layer 14, in its inner face opposite to the second layer 15, within a metal mould, provided with a cavity having the form of the product to be made.

It is then provided a step of compressing said layers 17'-17, one on the other, possibly together with the metal insert 18, at a predetermined temperature and for a predetermined time.

In this phase, the first layer 14 and the third layer 16 are cured together with the fifth layer 17', the second layer 15 and the fourth layer 17, creating a compact composite structure, possibly including the metal insert 18. In particular, the composite structure thus obtained has new mechanical and physical properties, not discernible in any known product, due to the curing of the rubber and to the bonding that the latter realizes with the fabrics of the fifth layer 17', of the second layer 15 and of the fourth layer 17.

In a still further version of the invention, the method, that is substantially similar to those previously described, comprises the steps of providing the first layer 14 of the seat 1. The method comprises a subsequent step of laminating the mixture of natural and/or synthetic rubber in thin sheets with constant thickness with homogeneous characteristics.

The step of providing the first layer 14 then comprises a step of cutting the laminated sheet with a die or other similar cutting organs.

By this cutting step, the perimeter of the first layer 14 is defined, so as to define the shape and dimensions of the finished product using the right amount of rubber blend. The method then provides a step of providing the second layer 15 of the seat 1, in natural or synthetic fabric, having the characteristics above disclosed.

Also the step of providing the second layer 15 comprises a step of cutting the natural or synthetic fabric with a die or other similar cutting organs, so as to define the shape and dimensions of the finished product using the right amount of fabric.

The process also involves a step of providing the fourth layer 17 of the seat 1, of natural fabric-type material.

Even the step of providing the fourth layer 17 comprises a step of cutting the natural fabric with a die cut or other similar cutting organs, so as to define the shape and dimensions of the finished product using the right amount of fabric.

The manufacturing method then comprises a step of positioning said layers 14-15-17 one on the other, in the listed order, within a metal mould, provided with a cavity having the shape of the product to be realized.

The possible insertion of the metallic insert 18 between the first layer 14 and second layer 15, at the front portion 5, is also foreseen.

Then a step of compressing said layers 14-15-17, one over the other together the metal insert 18, at a predetermined temperature and for a predetermined time, is also provided.

During this step, the first layer 14 is cured together with the second layer 15 and the fourth layer 17, thus realizing a compact composite structure, possibly including even the metal insert 18.

In particular, the composite structure thus obtained has new mechanical and physical properties, not discernible in any known product, due to the curing of the rubber and the bonding that the latter carries out with the fabrics of the second layer 15 and of the fourth layer 17.

With particular reference to the final assembly of the saddle S, at the end of the manufacturing method of the seat 1, the front and rear support elements 3, 4 are fixed to the latter, using the above mentioned fastening elements 11.

Subsequently, the connection means 2 are fixed with the seat post—in particular, the saddle rails—with front and rear support elements 3, 4.

In particular, the saddle rails 2 are inserted, with their respective front and rear ends, in the front housings 7 of the front support element 3, and in the rear housings 8 of the rear support element 4, thus obtaining the completed saddle S.

The method comprises a step of inserting bushings 8' of polymeric and/or elastomeric material which will receive the rear ends of the saddle rails, in the rear housings 8, for the vibrations damping and for ensuring a good fit between the metal parts with tight tolerances and a coupling that allows related degrees of freedom.

Figure 7:
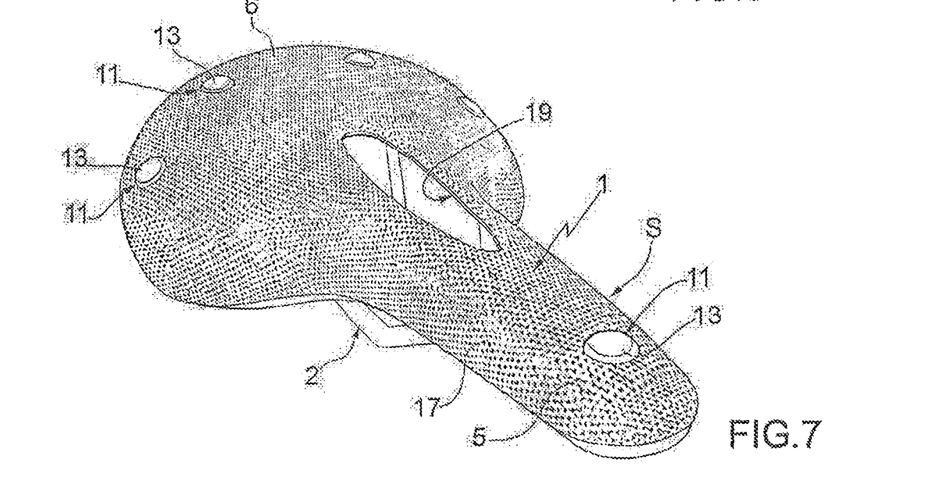
FIG. 7 is a perspective view of another embodiment of the saddle comprising the seat according to the invention.

In FIG. 7 another embodiment of the seat 1 according to the present invention, assembled in a saddle S, is shown.

In this embodiment, the seat 1 comprises a substantially slotted central opening 19, which affects all the layers 14-17 or 14-17' or 17-17' or 14-15-17.

This central opening 19 allows the reduction of the specific pressure on the parts of the user's body that are directly in contact with the fourth outer layer 17 of the seat 1 itself.

In other embodiments, a greater number of openings 19 that affect all the layers 14-17 or 14-17' or 17-17' or 14-15-17 may also be provided.

It is thus conceived that the invention achieves the proposed aims.

The seat according to the present invention has the typical mechanical characteristics of the reinforced rubber concerning the behaviour under the load of the weight of the user.

If necessary, it is possible to provide an insert 18 even in the rear portion 6 of the seat S.

In particular, the second layer 15 made of natural or synthetic fabric, preferably polyester, limits the compliance of the seat 1, thus preventing the latter from being excessively deformed under the load of the weight of the user.

Thanks to these characteristics, phenomena of under load-loosening do not occur, that are typical for example, of leather chairs.

Moreover, thanks to its characteristics of "dynamic flexibility", the seat 1 is able to immediately offer its comfort features of to maintain them over time contrarily, for example, of previous leather saddles that require an adjustment period to comply with the user.

Therefore, it is not necessary to provide adjustment means to put the seat in traction.

Moreover, the seat 1, thanks to its particular compact composite structure made from layers of materials having certain characteristics and a peculiar arrangement, cured together, does not require a shell or a support structure, to be fixed in use below the seat itself.

This seat, in fact, as disclosed for the various above presented versions, it is self-supporting, thus ensuring a low weight and a good comfort for the user. In fact, the seat according to the present invention is itself a support structure with a degree of stiffness such as to be sufficiently rigid to be supportive but at the same time sufficiently resilient to ensure comfort, all this being made from a single composite element.

Moreover, a further advantage of the seat according to the present invention is the possibility of obtaining some areas with differentiated thickness which allow a more localized deformability of the seat itself.

Together with these advantageous characteristics, the seat 1 according to the invention has the outer surface, intended to come directly in contact with the user, made of a natural fabric, and therefore comfortable to the touch.

The aforementioned outer surface has excellent characteristics of resistance to weathering, solar radiation, temperature fluctuations and other potentially harmful factors.

The outer surface is therefore extremely durable and suitable for each condition of use.

Moreover, this outer surface has a low coefficient of friction with the surfaces with which it comes in contact, and therefore has high abrasion resistance.

The present invention is described according to preferred embodiments, but equivalent variants can be devised without departing from the scope of protection offered by the following claims.

The invention claimed is:

1. A seat for bicycle saddles comprising:
   a first inner layer comprising a mixture of at least one of a natural and a synthetic rubber;
   a second layer, comprising a natural or synthetic fabric having a high tensile strength and low ultimate elongation, placed over said first inner layer;
   a third layer, made of a mixture of at least one of a natural and a synthetic rubber, placed over said second layer; and
   a fourth outer layer, made of a natural material comprising cotton, linen or silk placed over said third layer;
   said first inner layer and third layer being cured together with said second layer and fourth layer so as to make a compact composite structure.

2. The seat according to claim 1, comprising a fifth layer, made of a material of the natural or synthetic fabric, placed over said first layer, in a position opposite to said second layer.

3. The seat according to claim 2, wherein said first inner layer and third layer are cured together with said second layer and fourth layer and fifth layer.

4. The seat according to claim 2, wherein said second layer and said fifth layer is made of at least one of polyester fabric, cotton, hemp, linen or silk that has been suitably treated to allow adhesion to the material of the rubber type or mixtures thereof.

5. The seat according to claim 1, wherein said natural or synthetic fabric has a thickness comprised between 1 mm and 1.5 mm.

6. The seat according to claim 1, wherein said fourth layer comprises a treatment making it water-repellent, stain-resistant and abrasion-resistant.

7. The seat according to claim 1, comprising a reinforcing insert arranged between said second layer and said third layer or between said first inner layer and said second layer at the front portion of the saddle.

8. The seat according to claim 1, which has at least one of the following properties: specific weight equal to 1.10 Kg/dm3 and water absorption in 24 hours less than 1% of the water supplied and ultimate tensile stress Rm comprised between 100 and 500 daN/cm and percentage elongation equal to 10%±10%.

9. A method for manufacturing a seat of a bicycle saddle comprising the steps of:
  providing a first inner layer comprising a mixture of at least one of a natural and a synthetic rubber;
  providing a second layer, comprising a natural or synthetic fabric having a high tensile strength and low ultimate elongation;
  providing a third layer made of a mixture of at least one of a natural and a synthetic rubber,
  providing a fourth outer layer, made of a natural material comprising cotton, linen or silk;
  positioning said first, second, third and fourth layers one on top of the other inside a metallic mould having a cavity shaped like the product to be made; and
  compressing said first, second, third and fourth layers one on top of the other at a predetermined temperature and for a predetermined time, so as to cure said first inner layer and said third layer with said second layer and fourth layer making a compact composite structure.

10. The method according to claim 9, further comprising a step of inserting a reinforcing insert between said second layer and said third layer, or between said first inner layer and said second layer at the front portion of the saddle, carried out before said step of compressing said first, third, second and fourth layers one on top of the other.

11. The method according to claim 10, wherein said step of providing said first inner layer and said third layer made of a mixture of at least one of a natural and a synthetic rubber comprises a step of mixing natural rubber and synthetic rubber in appropriate percentages to ensure the optimal resistance to atmospheric agents and good workability.

12. The method according to claim 9, comprising a step of providing a fifth layer made of a material of the natural or synthetic fabric, a step of placing said fifth layer over said first layer, in a position opposite to said second layer, compressing said first, second, third, fourth and fifth layers one on top of the other at a predetermined temperature and for a predetermined time, so as to cure said first inner layer and said third layer with said second layer, fourth layer and fifth layer making a compact composite structure.

13. The method according to claim 12, comprising a step of cutting the perimeters of said first, second and fourth layers and said third and fifth layers so as to define the shape and size of the seat, said step being carried out before said step of positioning said first, second and fourth layers and said third and fifth layers one on top of the other inside a metallic mould.

14. The method according to claim 12, comprising a step of inserting a reinforcing insert between said second layer and said third layer, or between said first inner layer and said second layer at the front portion of the saddle, carried out before said step of compressing said first, second and fourth layers and said third and fifth layers one on top of the other.

15. The method according to claim 9, comprising a step of treating said fourth layer with a water solution suitable for imparting water-repellence, stain-resistance and abrasion resistance.

16. The method according to claim 9, wherein said predetermined temperature is comprised between 100° C. and 200° C., and it is preferably 160° C.

17. The method according to claim 9, wherein said predetermined time is comprised between 10 minutes and 20 minutes, and it is preferably 15 minutes.

18. The method according to claim 9, wherein said step of compressing said layers one on top of the other is carried out through a press with tonnage of 200 t.

19. The method according to claim 9, wherein said step of providing said first inner layer and said third layer made of a mixture of at least one of a natural and a synthetic rubber, comprises a step of laminating the mixture of at least one of the natural and synthetic rubber in thin sheets having constant thickness with homogeneous characteristics.

20. A saddle for bicycles and the like, comprising a seat according to claim 1.

21. A seat for bicycle saddles comprising:
  a first inner layer comprising a mixture of at least one of a natural and a synthetic rubber;
  a second layer, comprising a natural or synthetic fabric having a high tensile strength and low ultimate elongation, placed over said first inner layer; and
  an outer layer, made of a natural material comprising cotton, linen or silk placed over said first inner layer;
  having the second layer overlapping a face of the first inner layer, and the outer layer, overlapping the opposite face of the first inner layer, wherein the second layer and the outer layer are visible from the outside, respectively, from an outer portion of the saddle and from an inner portion thereof, whereas the seat is in its use position,
  said first inner layer being cured together with said second layer and said outer layer so as to make a compact composite structure.

22. The seat according to claim 21, further comprising a reinforcing insert arranged between said first inner layer and said second layer at the front portion of the saddle.

* * * * *